(12) United States Patent
Chan et al.

(10) Patent No.: US 7,151,861 B2
(45) Date of Patent: Dec. 19, 2006

(54) RASTER IMAGE TRANSFORMATION CIRCUIT USING MICRO-CODE AND METHOD

(75) Inventors: Jason Chan, Richmond Hill (CA); Tom Longo, Richmond Hill (CA)

(73) Assignee: Vixs Systems Inc., Toronto (CA)

( * ) Notice: Subject to any disclaimer, the term of this patent is extended or adjusted under 35 U.S.C. 154(b) by 667 days.

(21) Appl. No.: 09/954,146

(22) Filed: Sep. 18, 2001

(65) Prior Publication Data

US 2003/0053716 A1    Mar. 20, 2003

(51) Int. Cl.
*G06K 9/32* (2006.01)

(52) U.S. Cl. .................. 382/298; 382/299; 382/300

(58) Field of Classification Search ........... 382/298, 382/299, 300, 303; 358/581, 582, 451
See application file for complete search history.

(56) References Cited

U.S. PATENT DOCUMENTS 5,790,714 A * 8/1998 McNeil et al. ............. 382/300

6,252,576 B1 * 6/2001 Nottingham ................ 345/660

* cited by examiner

*Primary Examiner*—Bhavesh M. Mehta
*Assistant Examiner*—Wes Tucker

(57) ABSTRACT

A circuit for transforming a raster image at least partially stored within an image buffer includes memory storing micro-code; a multiplier; an accumulator; and a sequential logic circuit. The multiplier is in communication with the image buffer and the memory and is operable to form a weighted pixel value as a product of a given pixel value from the buffer and an associated weighting factor within the micro-code. The sequential logic circuit is in communication with the memory and the buffer. It steps through the pixels and the memory to present pixels in the buffer and associated weighting factors from the micro-code, to the multiplier. The accumulator sums weighted pixel values calculated by the multiplier. Conveniently, the memory may be loaded with coefficients of linear equations to scale a raster image.

24 Claims, 4 Drawing Sheets

$$R_1 = \frac{n \cdot S_1 + (m-n) \cdot S_2}{m}$$

$$R_2 = \frac{(2n-m) \cdot S_2 + (2m-2n) \cdot S_3}{m} \quad \text{for } m > n$$

$$R_2 = \frac{(3n-2m) \cdot S_3 + (3m-3n) \cdot S_4}{m}$$

RASTER IMAGE TRANSFORMATION CIRCUIT USING MICRO-CODE AND METHOD

FIELD OF THE INVENTION

The present invention relates to image processing, and more particularly to a method and circuit for transforming raster images.

BACKGROUND OF THE INVENTION

In a digital world, images are regularly represented by a rectangular array of regularly sampled elements referred to as pixels. Each pixel is represented by one or more values that specifies the color and intensity of the pixel. An image so represented, is said to be rasterized. Digitally presented motion pictures, such as those encoded using MPEG, MPEG 2 and MPEG 4 standards are decoded and ultimately presented as raster images.

Raster images, unlike vector images, have a defined size. As such, there is often a need to scale existing images to a desired or required size. Many raster scaling techniques are therefore known and understood. For example, a common scaling technique replicates (up-samples) pixels and averages adjacent pixels.

Known techniques, however, typically operate on the entire image, and thus do not lend easily themselves to scaling streamed images in real time. As well, they typically calculate and store intermediate versions of a scaled image. Moreover, they do not lend themselves to flexible implementation in hardware. Although some hardware scaling circuits are known, most of these are inflexible, and best suited to scale images by a fixed scaling ratio. More flexible image scaling is possible using software. Software image scaling, however, typically requires some computing power, and as such is not favored in integrated circuit designs.

Accordingly, an improved method and associated devices for scaling raster images are desirable.

SUMMARY OF THE INVENTION

It is therefore an object of the present invention to provide a circuit that may transform a source image into a resultant image without storing a computed intermediate image.

It is a further object of the present invention to provide a circuit that may quickly and serially scale a raster image.

It is a further object of the present invention to provide a raster image transformation circuit that may be formed on a single integrated circuit substrate.

It is yet a further object of the present invention to provide a circuit that may be flexibly adapted using micro-code, allowing scaling by arbitrary scaling ratios.

According to an aspect of the present invention, there is provided a circuit for transforming a raster image at least partially stored within an image buffer. The circuit includes memory storing micro-code; a multiplier; an accumulator; and a sequential logic circuit. The multiplier is in communication with the image buffer and the memory and is operable to form a weighted pixel value as a product of a given pixel value from the buffer and an associated weighting factor within the micro-code. The sequential logic circuit, is in communication with the memory and the buffer, and steps through the pixels and the memory to present pixels in the buffer and associated weighting factors from the micro-code, to the multiplier. The accumulator sums weighted pixel values calculated by the multiplier.

In accordance with another aspect of the present invention, a method of scaling by m:n, a raster source image including at least one array of source pixels stored within an image buffer, to form an array of resultant pixels, includes using a processor to calculate coefficients of n linear equations, each of these n linear equations expressing a linear relationship between adjacent pixels in the array of source pixels and one of the resultant pixels; storing the coefficients in a memory; and using a sequential logic circuit to step through the memory and the buffer to present values to a circuit operable to calculate each of the resultant pixels as a weighted sum of adjacent pixels in the source image, using one of the n linear equations.

Other aspects and features of the present invention will become apparent to those ordinarily skilled in the art upon review of the following description of a specific embodiment of the invention in conjunction with the accompanying figures.

BRIEF DESCRIPTION OF THE DRAWINGS

In the following figures which illustrate, by way of example only, embodiments of the invention.

DETAILED DESCRIPTION

Figure 1:
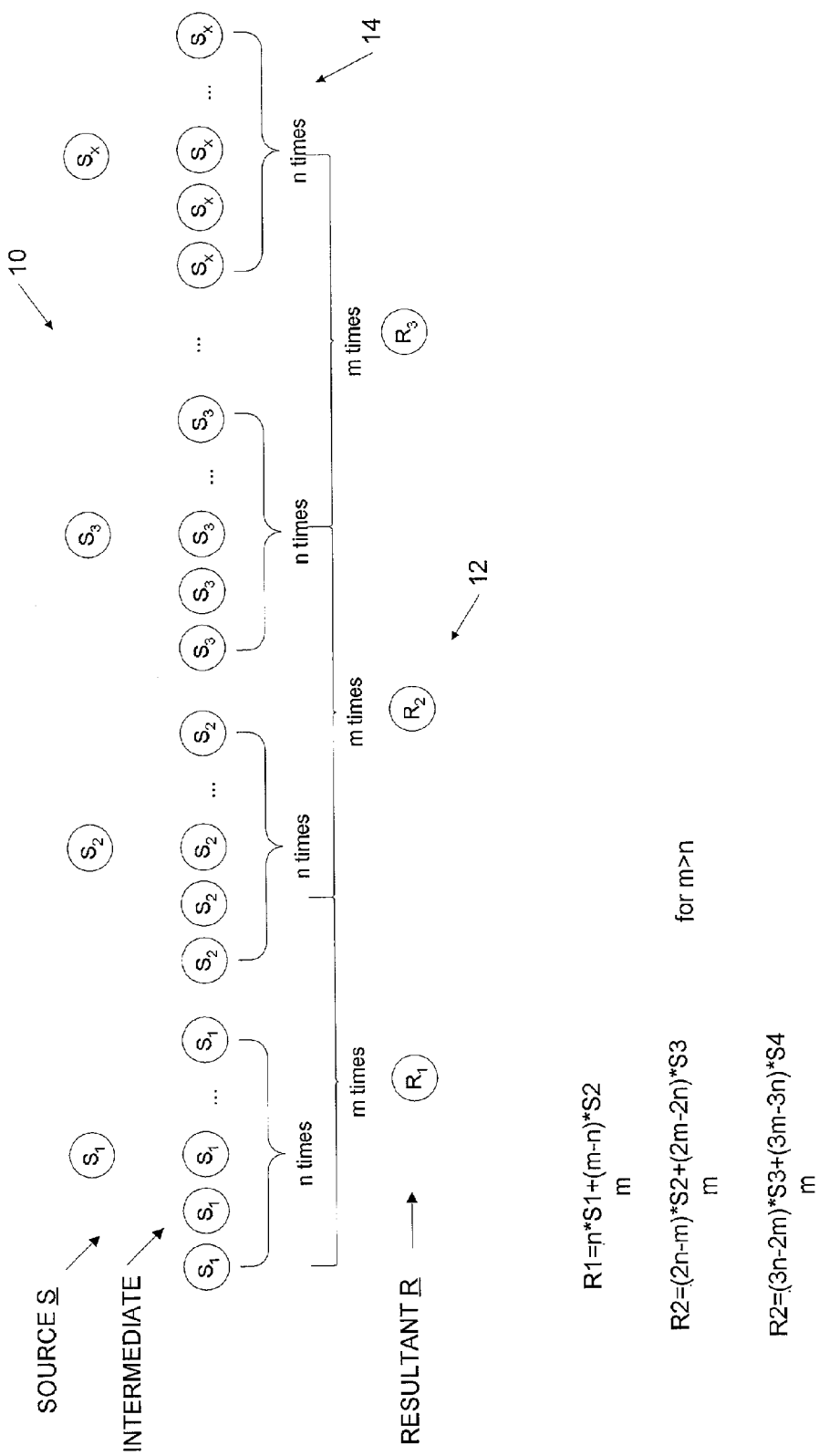
FIG. 1 illustrates scaling of a source image.

FIG. 1 illustrates horizontal scaling of a raster image 10 by a scaling ratio of m:n using a conventional scaling technique to form a resultant image 12. Image 10 is represented as a row of a rectangular bitmap. Each entry of the bitmap represents the value of a pixel. As illustrated in FIG. 1, each source pixel within each row is first replicated (or up-sampled) n times to form an intermediate version 14 of thereof. Thereafter, m adjacent up-sampled pixels are averaged, and replaced with a single resultant pixel having this averaged value (re-sampled). These steps may be repeated for each group of m pixels in a row. Thereafter these steps are repeated for each row. As will be appreciated, every m pixels in the source image are replaced by n pixels in the resultant image. As such, if n>m the resultant image is larger than the source image. If desired, the image may be similarly vertically scaled by applying the described scaling technique to columns of pixels of the horizontally scaled image. Optionally, the up-sampled version of the image may be filtered prior to re-sampling in order to remove frequencies created by the up-scaling and frequencies that may alias during re-sampling. The technique is, for example, more fully described in Keith Jack, Video Demystified, LLH Technology Publishing the contents of which are hereby incorporated by reference.

As should be appreciated, this scaling technique requires computation of an intermediate, up-scaled version 14 of each array of pixels (i.e. row or column) of the image to be scaled. This, in turn, requires storage of n*x pixels for each array of x pixels. Moreover, this technique requires an up-scaled array to be computed prior to computing a resultant pixel for a scaled array. This, in turn, causes delays in scaling the image.

Figure 2:
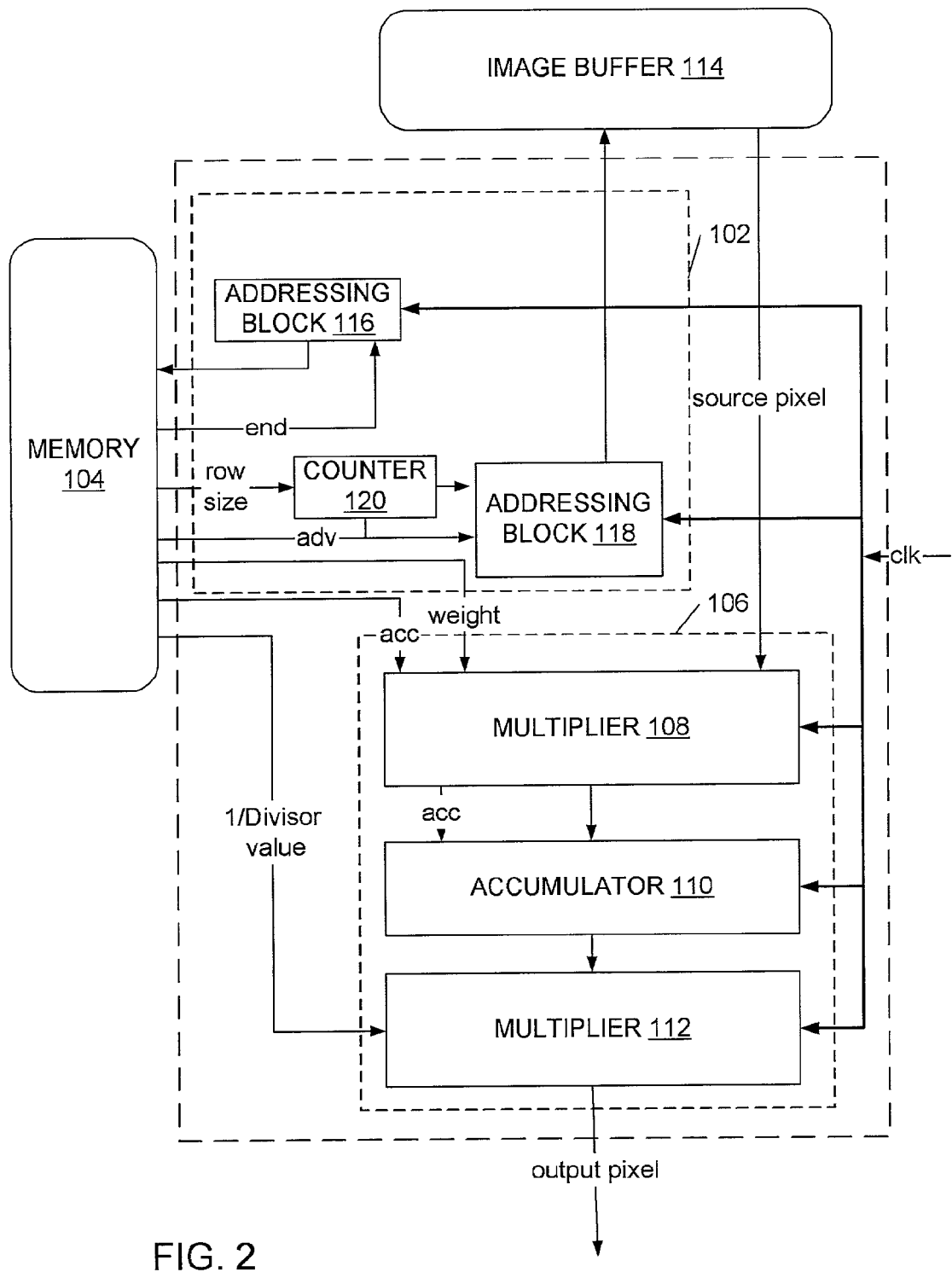
FIG. 2 illustrates an image transformation circuit, exemplary of an embodiment of the present invention.

Accordingly, exemplary of the present invention, FIG. 2 illustrates a hardware scaling circuit 100 operable to scale an image to produce results obtained by the technique described with reference to FIG. 1. Advantageously, circuit 100 may scale an image serially, without forming an array of up-scaled pixels. Moreover, as will become apparent, circuit 100 may easily be adapted to scale an image by any desired value, simply by pre-loading circuit 100 with required parameters.

Circuit 100 relies on the observation that a fixed linear relationship exists between source pixels, and resultant scaled pixels. This may easily be observed by considering scaling an image by a factor of 4:3. So, using the above described technique, a resultant array R={r1, r2, r3, . . . } representing a scaled version of an array of source pixels S={s1,s2,s3 . . . } may be computed, as $r1=(s1+s1+s1+s2)/4=0.75*s1+0.25*s2$ $r2=(2*s1+2*s2)/4=0.5*s1+0.5*s2$ $r3=(s2+3*s3)/4=0.25*s2+0.75*s3$ $r4=(3*s3+s4)/4=0.75*s3+0.25*s4$ $r5=(2*s4+2*s5)/4=0.5*s4+0.5*s5$ $r6=(s5+3*s6)/4,=0.25*s5+0.75*s6$, and so on.

This observation may be generalized, as a matrix relationship between R and S to scale S by a factor of m:n. That is, $R=[Q]S^T;$ where S is the array or vector of source pixels (x pixels); Q is a transformation matrix having $\lceil n/m \rceil *$ x rows, and x columns; and R is the row vector (array) of ($\lceil n/m \rceil *$x) resultant pixels.

So, an array scaled using a 4:3 scaling matrix may be written as:

$R=3\ 1\ 0\ 0\ 0\ 0\ 0\ \ldots * S^T$ $0\ 2\ 2\ 0\ 0\ 0\ 0\ \ldots$ $0\ 0\ 1\ 3\ 0\ 0\ 0\ 0$ $0\ 0\ 0\ 0\ 3\ 1\ 0\ 0$ Put another way, each entry of the array of resultant pixels may be formed as the dot product of a row vector of the transformation matrix Q and a vector representation of the source pixels. As will be appreciated, each dot product is calculated as a weighted sum of pixels in the source array. The weighting of each pixel in the source array is governed by the coefficients in the row of the transformation matrix. That is, $ri=\Sigma sj*Q(i,j)$ Put yet another way, each resultant pixel may be computed using a linear equation, expressing the linear relationship between source pixels and the resultant pixel.

The coefficients of Q for the above described m:n scaling matrix, may be easily determined as follows:

STEP 1: Set the first entry of row 1 to the lesser of m and n. Keep track of a running sum of the entries in row 1. If m>n, set subsequent entries of row 1 to n, until the difference between running sum for row 1 and m is less than n. Set the next (and final) entry in the row to a value, so that the sum of entries within the first row equals m. As a result, for m>n, the first row of the matrix will be populated with $\lfloor m/n \rfloor$ terms having a value of n, and one term having a value of m mod n. For m<n, the first row will be populated with 1 term having a value of m.

STEP 2: Once entries of the previous (first) row are determined, determine entries of the next (second) row beginning with the column entry of the next (second) row corresponding to the first column for which the sum of the column entries is less than n. Set this column entry to the lesser of m and the value making the sum of entries in the column equals to n.

STEP 3: Thereafter, the remaining entries of the next (second) row may be determined, in the same manner as entries of the first row were determined: Keep a running sum of entries in the row, set entries to the lesser of m and n; until the running sum is less than n away from m; and set the last entry to a value making the sum of the row equal to m. For m>n, each row will thus, at most, have two non-zero entries not equal to n.

STEP 4: Repeat steps 2 and 3 for rows 3 to n/m*x (x=size of image/array to be scaled).

STEP 5: At the conclusion of these steps, each entry of the matrix may be scaled by a factor of 1/m to arrive at the scaling matrix Q.

From this, certain symmetries of matrix Q may be observed:

(1) Prior to scaling by 1/m, the sum of entries of any row equals m.

(2) Prior to scaling, the sum of any column equals n. Thus, each entry has a value between 0 and n (3) If the final non-zero entry (prior to scaling) of a row does not equal n, its column will correspond to the column having the first non-zero entry in the subsequent row.

(4) Q is sparse.

(5) Q may be completely described with n+m−1 non-zero values.

(6) For m>n, each row has no more than $\lceil m/n \rceil$ non-zero coefficients. For m<n, each row has no more than two non-zero coefficients;

(7) Only n rows of unique coefficients exist; and (8) Prior to scaling, only the first and last term in each row may have a value not equal to n (for m>n).

As a consequence, for m>n, any pixel in the resulting image may be calculated as the weighted sum of $\lceil m/n \rceil$ adjacent pixels in the source image. The weighting of the adjacent pixels is given by coefficients within a row. Thus, as there are only n unique rows, any pixel in the resultant image may be formed using one of n linear equations expressing a resultant pixel as a linear combination of $\lceil m/n \rceil$ adjacent pixels.

Thus, for example, a 4:3 scaling matrix may be described with six non-zero coefficients. Any resultant pixel may be calculated as the scaled weighted sum of $\lceil 4/3 \rceil$=two source pixels.

For m<n, any resultant pixel may be calculated as the scaled weighted sum of one or two adjacent pixels.

Conveniently, once a scaling matrix has been computed its values may be stored and need not be recomputed for each image that is scaled by the same scaling ratio.

More significantly, pre-computing coefficients of the transformation matrix Q allows scaling to be elegantly implemented using circuit 100, illustrated in FIG. 2.

Specifically, a circuit 100 exemplary of an embodiment of the present invention may be formed using a sequencing state-machine 102; coupled to micro-code memory 104; and a scaling kernel 106 including a multiplier 108; accumulator 110; and multiplier/divider 112. Scaling circuit 100 is further in communication with an image buffer 114. Image buffer 114 stores the rasterized source image, or arrays thereof.

Image buffer 114 may store an entire image to be scaled. Alternatively image buffer 114 may store only a portion of an image to be scaled. For example buffer 114 may store a sequence consisting of a finite number of pixels of an image that is received serially.

State sequencer 102 may for example be formed using conventional sequential logic. As illustrated, state sequencer 102 includes an addressing block 116 interconnected with address lines of memory 104; and a further addressing block 118 interconnected with the address lines of a direct memory access controller (not shown) in communication with image buffer 114. State sequencer 102 further includes a counter 120. Counter 120, may be a conventional down counter, that may be pre-loaded with a value representative of the unscaled image's row size, to be decremented. Data lines of memory 104 provide stored outputs within memory 104 to scaling kernel 106. Scaling kernel 106 including multiplier 108, accumulator 110; and divider 112 may be formed as conventional integrated circuit blocks co-located on a single integrated circuit substrate using ASIC, LSI or VLSI design techniques known to those of ordinary skill in the art. Suitable building blocks are detailed in K. C. Chang, Digital Systems Design with VHDL and Synthesis—An Integrated Approach, IEEE Computer Society, 1999 and Neil H. E. Weste et al., Principles of CMOS VLSI Design—A Systems Perspective (2d), Addison Wesley 1994, the contents of both of which are hereby incorporated by reference.

In operation, at any time state sequencer 102 presents a single pixel from buffer 114 and a single associated weighting factor and control information from memory 104 to kernel 106. State sequencer 102, under control of addressing block 118 selects which pixel within image buffer 114 is presented to scaling kernel 106. Similarly, addressing block 116 presents an address of associated micro-code to memory 104. On the rising edge of a clock cycle, state sequencer 102 advances to its next state. In its next state it presents the next weighting factor from memory 104 to multiplier 108. Control information associated with the current weighting factor and current state governs whether or not addressing block 118 should advance to the next pixel within buffer 114 as it advances states.

Figure 3:
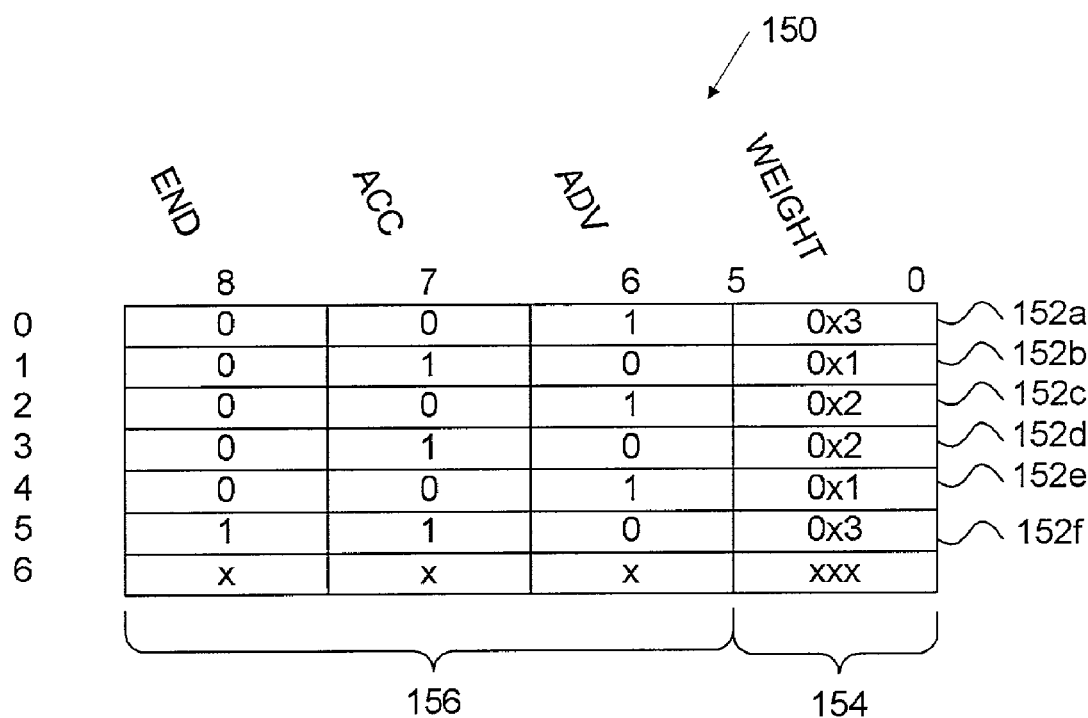
FIG. 3 illustrates exemplary micro-code used by the circuit of FIG. 2.

Example contents of memory 104 are illustrated in FIG. 3. As illustrated, memory 104 contains micro-code 150 including a plurality of micro-code entries 152a–152f (collectively and individually 152), a scaling factor 158, and an indicator of row size 159. Each example micro-code 152 entry contains a multi-bit weight factor 154, and control information 156. The entries of micro-code 150 and their significance are described below.

At the transition of each clock cycle, state sequencer 102 (FIG. 2) advances to the next weighting factor within micro-code 150 within memory 104 and presents the value of the pixel to be weighted and weighting factor from image buffer 114 and memory 104, respectively, to multiplier 108. At the same time, accumulator 110 latches the previously calculated output of multiplier 108, as well as the associated control information 156. The control information 156 (and specifically the ACC bit associated with the weighting factor) is used by accumulator 110 to determine if it should release its accumulated value. If so, it releases its accumulated value and the control information to multiplier 112 prior to processing the presented input. Once its output is released it resets its accumulated value to zero. If the control information 156 indicates otherwise, accumulator 110 continues to sum the output of multiplier 108 to its accumulated value, until it receives a signal in control information 156 requiring release of the accumulated value. Once provided to multiplier 112, the accumulated value is multiplied by a final scaling value 158 (FIG. 3) provided by memory 104. This final scaling value 158 equals 1/m and will be identical for all pixels within the array, and indeed for all pixels in the image. The output of multiplier 110 provides the value of one of the resultant pixels, scaled as desired. This resultant pixel may be provided to another image buffer (not illustrated).

Conveniently, multiplier 108, accumulator 110, and divider 112 are formed as pipelined LSI or VLSI building blocks, clocked by a common source (CLK in FIG. 1). Within each clock cycle then, multiplier 108 may multiply one source pixel by one scaling value; accumulator 110 may sum the value of a previously weighted source pixel; and multiplier 112 may divide the sum of a previously calculated set of source pixels.

As noted, FIG. 3 illustrates sample micro-code 150 stored within memory 104. The exemplified micro-code 150 may be used to scale images using a 4:3 scaling ratio, and may be derived from a corresponding 4:3 transformation matrix Q. As illustrated, each element of micro-code 152 may be stored using nine bits. Six bits (bits 0–5) store a weighting factor, three additional bits (bits 6–8) store accompanying control information 156. Of course, the number of bits used to store the weighting factor is somewhat arbitrary and will depend largely on the desired scaling ratio.

Circuit 100 may thus scale an image by 4:3 by first loading an initial pixel of a buffered image and weighting it by a factor of three (bits 0–5, 152a) at multiplier 108. The weighted output is presented from multiplier 108 to accumulator 110. Upon transition of a clock cycle, accumulator 110 latches the previous output of multiplier 108. As the ADV bit is set (ADV bit 6=1, 152a), state sequencer 102 advances to the next image pixel, and presents it and a scaling factor of one (bits 0–5, micro-code 152b) to multiplier 108. The weighted output is again presented to accumulator 110. Upon transition to the next clock cycle, accumulator 110 latches this output of multiplier 108. Counter 120 is also clocked by the ADV bit. Each time counter 120 encounters an ADV bit, it is decremented, from the original row value 159 stored within memory 104. As the ACC control bit (bit 7, micro-code 152b) is 1, accumulator 110 adds the latched value to the previous value stored within the accumulator 110. Upon transition to the next clock cycle, state sequencer 102 does not advance to the next pixel, as the ADV control bit has a value of 0 (bit 6, 152b). Instead, state sequencer 102 re-presents the second pixel and the third micro-code weighting value to multiplier 108. Its output is presented to accumulator 110. Upon transition to the next clock cycle, accumulator 110 latches this output of multiplier 108. However, as the ACC control bit has a value of 0, (ACC bit 7, 152c) accumulator 110 transfers its previous value to multiplier 110. Upon receipt of the output of accumulator 110, multiplier 110 multiplies the presented value by the scaling value 158 and presents its output. Input to a buffer (not shown) to store the resultant image, may be clocked by the propagated ACC control bit, and receive the output of multiplier 110.

State sequencer 102 continues to load weighting values and pixel values as dictated by micro-code 152d–152f. Upon being presented with an END control signal (bit 8, 152f), state sequencer 102 is reset to the beginning of its sequence and micro-code 152a–152f is reused for subsequent pixels.

State sequencer 102 repeats transitions through its states until counter 120 reaches a value a zero, signifying an entire row has been scaled. As noted, as each pixel within a row is multiplied by an associated weighting factor, this counter may be decremented. Counter 120 ensures that pixels in subsequent rows do not form part of a weighted average. Once counter 120 reaches a value of 0 it is again pre-loaded with row value 159 of micro-code 150. As will be appreciated, counter 120 could easily be formed as an up-counter, adapted to count from 0 to the number of pixels within a row. Counter 120 may be pre-loaded with a value from memory 104.

It should be appreciated that use of the ADV bit of control information 156 in the above example is used to exploit certain symmetries within transformation matrix Q. That is, for the transformation matrix corresponding to 4:3 scaling, the last non-zero entry of any row corresponds to the first non-zero entry of a subsequent row. Specifically, use of the ADV bit allows the value of one pixel to be used in two subsequent weighting combinations. Use of the ADV bit of control information 156 could easily be eliminated by simply including a zero weighting for each of the zeroes within transformation matrix Q. This, however, would severely increase the size of micro-code stored within memory 104.

Figure 4:
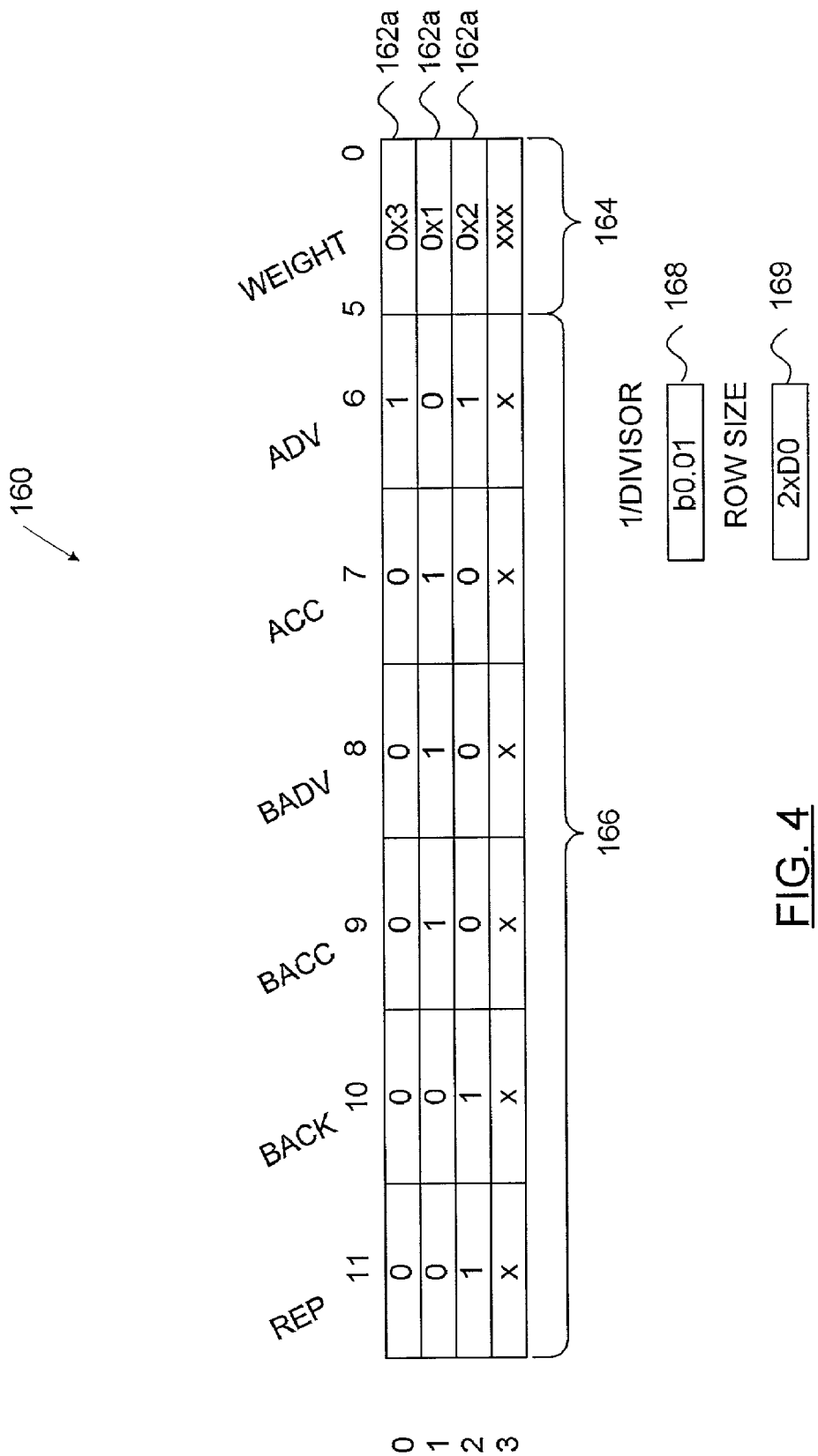
FIG. 4 illustrates exemplary micro-code usable with a variant of the circuit of FIG. 2.

By exploiting additional observed symmetries of matrix Q, circuit 100 may be modified so that even fewer values need to be stored. Specifically, FIG. 4 illustrates alternate micro-code 160 for scaling an image by a 4:3 scaling ratio. Micro-code 160 unlike micro-code 150 includes only three micro-code entries 162a, 162b and 162c (individually and collectively 162) and a scaling factor 168, and a row size 169. Control information 166 associated with each micro-code entry 162, however, includes three additional control bits BADV, BACC, BACK, REP in bits 8, 9, 10 and 11. Micro-code 160 effectively exploits the observation that the coefficients within the rows will repeat once a row that begins and ends with the same entry is encountered. Thus, for the 4:3 scaling matrix, the row beginning with a value of two, signifies that the coefficients begin to repeat.

State sequencer 102 may now be modified apply micro-code 162 in a forward direction, and in a reverse direction. That is, sequencer 102 may process entries 0, 1 and 2 of micro-code 160 in exactly the same way as entries 0, 1 and 2 of micro-code 150 using bits 6 and 7 of control information 166. However, upon encountering an entry of 1 in the BACK bit of control information 166, sequencer may change direction of processing micro-code entries 160, and may again process entries 2, 1 and 0 of micro-code 160. A REP control bit, causes state sequencer 102 to use entry 2 twice. In this way, micro-code 160 could be modified to accommodate scaling matrices that are symmetric about a row that does not include a double entry. Control bits BADV and BACC may be used in place of ADV and ACC as state sequencer 102 advances through micro-code 160 in a backward direction. Once state sequencer 102 encounters entry 0 within micro-code 160, the sequencer may again parse micro-code 160 in a forward direction. A person of ordinary skill will readily appreciate how sequencer 102 may be modified.

Micro-code 150 or micro-code 160 may be stored once a desired transformation matrix Q has been determined, as described above. As will be appreciated, stored micro-code may be formed by storing only needed values of the matrix Q and appending required control codes. Thus, only m+n−1 (or ⌈(m+n−1)/2⌉) micro-code entries need be stored for a scaling matrix that scales an image by m:n. Advantageously, micro-code for a number of common transformations (e.g. scaling by typical ratios) may be stored within memory 104.

Conveniently, after one array representing, for example, a row of a raster image, has been scaled, buffer 114 may be loaded with a subsequent row. Alternatively, multiple circuits all having the form of circuit 100 may operate simultaneously on multiple arrays of pixels. Conveniently, circuit 100 may be replicated numerous times on a single integrated circuit substrate, and share the same memory 104. Image buffer 114 for each separate circuit may be loaded with a different row to be scaled.

Once an image has been scaled horizontally, circuit 100 may be used to similarly scale the image vertically. State sequencer 102, however, will need to scale vertically adjacent pixels. As such, loading of subsequent pixels may require incrementing an index to buffer 114 by an entire row.

Conveniently, in the event an image includes multiple component bitmaps (e.g. chrominance and luminance; color components and luminance, etc.) each component bitmap may be scaled using circuit 100. Again multiple bitmaps associated with a single image may be scaled in parallel by multiple embodiments of circuit 100. Once scaled, the bitmaps may be combined to present the scaled image.

Conveniently, scaling circuit 100, may be used in combination with one or more other processors. Scaling circuit 100 may be used on a computer graphics card, in combination with another graphics processor, or central processor; as part of a set-top box; or the like. Suitable micro-code values for any arbitrary scaling ratio may be stored or calculated by another processor and loaded into memory 104, as required or desired.

As should now be appreciated, circuit 100 presents a hybrid scaling approach: micro-code values representing a desired scaling ratio may be calculated and stored (e.g., in software), and thereafter the operation of circuit 100 may scale an image (i.e., in hardware).

It should now be appreciated that the circuit 100, with suitable micro-code lends itself to any form of transformation of an image that may be expressed as a matrix. In order to take an arbitrary dot product of a row and column vector, control information (not specifically illustrated) within the micro-code may cause sequencer 102 to use different coefficients representing different rows of a transformation matrix for each resultant pixel. Control bits (not shown) may cause sequencer 102 to re-use each row of the image for each dot product. In the event subsequent rows of an image need to be transformed differently, multiple circuits each using different stored micro-code coefficients may be used. Alternatively, state sequencer 102 may use different portions of memory 104 as circuit 100 transforms subsequent rows within memory 104.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of scaling by m:n, a raster source image comprising at least one array of source pixels stored within an image buffer, to form an array of resultant pixels, said method comprising:

using a processor to calculate coefficients of n linear equations, each of said n linear equations expressing a linear relationship between adjacent pixels in said may of source pixels and one of said resultant pixels;

storing said coefficients in a memory;

using a sequential logic circuit to step through said memory and said buffer to present values to a circuit operable to calculate each of said resultant pixels as a weighted sum of adjacent pixels in said source image, using one of said n linear equations.

2. The method of claim 1, wherein said calculating each of said resultant pixels comprises multiplying each of said source pixels by an associated weighting factor to form weighted source pixels, and wherein one of said source pixels is multiplied by a weighting factor, while another one of said weighted source pixels is summed.

3. The method of claim 1, wherein said storing comprises storing m+n−1 distinct coefficients within said memory.

4. A circuit for scaling a raster image at least partially stored within an image buffer by m:n, said circuit comprising:

memory storing micro-code comprising coefficients of n linear equations, each of said n linear equations expressing a linear relationship between adjacent pixels in said raster image and one resultant pixel in a resultant image for scaling said raster image by a scaling ratio of m:n;

a multiplier in communication with said image buffer and said memory operable to form a weighted pixel value as a product of a given pixel value from said image buffer and an associated weighting factor within said micro-code;

a sequential logic circuit, in communication with said memory and said buffer, said sequential logic circuit operable to step through said pixels and said memory to present pixels in said buffer and associated weighting factors from said micro-code, to said multiplier, to produce n output pixels for each m pixels of said raster image;

an accumulator in communication with said multiplier to sum weighted pixel values calculated by said multiplier.

5. The circuit of claim 4, wherein said weighting factors are derived from non-zero coefficients of a scaling matrix for computing an array of resultant pixels from an array of source pixels.

6. The circuit of claim 4, wherein said micro-code further comprises control information controlling states of said sequential control circuit.

7. The circuit of claim 6, wherein said control information advances said sequential logic circuit to step through said pixels.

8. The circuit of claim 6, wherein said multiplier and said accumulator are pipelined.

9. The circuit of claim 8, wherein said multiplier, said accumulator, and said sequential logic are interconnected to a common clock.

10. The circuit of claim 4, further comprising a second multiplier in communication with an output of said accumulator, to scale an accumulated value of said weighted pixels by a scale factor.

11. The circuit of claim 10, wherein said scale factor is stored within said memory.

12. The circuit of claim 11, wherein said second multiplier and said accumulator are pipelined.

13. The circuit of claim 9, wherein said accumulator is reset by control information within said micro-code.

14. The circuit of claim 13, wherein said control information is associated with said weighting factors, and wherein said control information is passed from said memory to said accumulator.

15. The circuit of claim 4, wherein said multiplier, said accumulator and said state sequencer are co-located on a single integrated circuit substrate.

16. The circuit of claim 4, wherein said micro-code stores m+n−1 coefficients for scaling a source image by a scaling of ratio of m:n.

17. The circuit of claim 4, wherein said micro-code stores [(m+n−1)/2] coefficients for scaling a source image by a scaling of ratio of m:n.

18. A circuit for transforming a raster image at least partially stored within an image buffer, said circuit comprising:

means for storing micro-code comprising coefficients of n linear equations, each of said n linear equations expressing a linear relationship between adjacent pixels in said raster image and one resultant pixel in a resultant image for scaling said raster image by a scaling ratio of m:n;

means for forming a weighted pixel value as a product of a given pixel value from said image buffer and an associated weighting factor within said micro-code;

means for stepping through said pixels and said memory to present pixels in said buffer and associated weighting factors from said micro-code to said multiplier;

means for summing weighted pixel values calculated by said multiplier, to produce n output pixels for each m pixels of said raster image.

19. The method of claim 1, further comprising storing in said memory, control information used by said sequential logic to step through said memory and said buffer.

20. The method of claim 19, further comprising advancing said sequential logic by one pixel within said buffer, in response to a control bit stored within an entry of said memory being processed.

21. The method of claim 20, further comprising providing an output value, in response to a control bit stored within an entry of said memory being processed.

22. The method of claim 20, further comprising stepping said sequential logic backward by one entry within said memory, in response to a control bit stored within an entry of said memory being processed.

23. The method of claim 20, further comprising stepping said sequential logic forward by one entry within said memory, in response to a control bit stored within an entry of said memory being processed.

24. The method of claim 1, further comprising storing a scaling factor in memory, and scaling said weighted sum of adjacent pixels by a scaling factor.

* * * * *